United States Patent
Niu et al.

(10) Patent No.: US 12,549,203 B2
(45) Date of Patent: Feb. 10, 2026

(54) ENCODING AND DECODING METHOD FOR SEMANTIC CHANNEL AND RELATED DEVICE

(71) Applicant: Beijing University of Posts and Telecommunications, Beijing (CN)

(72) Inventors: Kai Niu, Beijing (CN); Yang Liu, Beijing (CN); Ping Zhang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 21 days.

(21) Appl. No.: 18/924,216

(22) Filed: Oct. 23, 2024

(65) Prior Publication Data

US 2025/0240037 A1 Jul. 24, 2025

(30) Foreign Application Priority Data

Jan. 22, 2024 (CN) .......................... 202410090152.9

(51) Int. Cl.
*H03M 13/00* (2006.01)
*G06F 40/30* (2020.01)
*H03M 13/15* (2006.01)
*H03M 13/19* (2006.01)

(52) U.S. Cl.
CPC ............ *H03M 13/19* (2013.01); *G06F 40/30* (2020.01); *H03M 13/1535* (2013.01)

(58) Field of Classification Search
CPC ..................................................... G06F 40/30
See application file for complete search history.

(56) References Cited

U.S. PATENT DOCUMENTS

| | | | |
|---|---|---|---|
| 10,199,051 B2* | 2/2019 | Binder | G10L 17/24 |
| 10,361,802 B1* | 7/2019 | Hoffberg-Borghesani | |
| | | | G06F 3/00 |
| 2021/0335354 A1* | 10/2021 | Park | G10L 15/063 |
| 2023/0033774 A1 | 2/2023 | Koike-Akino et al. | |
| 2023/0094234 A1* | 3/2023 | Roessel | H04N 19/20 |
| | | | 375/240.02 |
| 2023/0198663 A1* | 6/2023 | Stoica | H04L 1/0056 |
| | | | 714/726 |
| 2024/0121453 A1* | 4/2024 | Roessel | H04N 19/132 |

FOREIGN PATENT DOCUMENTS

| | | |
|---|---|---|
| CN | 111241832 A | 6/2020 |
| CN | 113271110 A | 8/2021 |
| CN | 114885370 A | 8/2022 |
| CN | 115309869 A | 11/2022 |
| CN | 115883018 A | 3/2023 |

OTHER PUBLICATIONS

International Search Report and Written Opinion issued in corresponding PCT Application No. PCT/CN2024/093812, dated Oct. 10, 2024.

* cited by examiner

*Primary Examiner* — Mujtaba M Chaudry
(74) *Attorney, Agent, or Firm* — Westbridge IP LLC

(57) ABSTRACT

Disclosed is an encoding method for semantic channels. According to the encoding method, a semantic codebook and synonymous mapping relationships may be obtained at first. Then, a syntactic information sequence to be transmitted may be determined. Further, a syntactic codeword from the semantic codebook corresponding to the syntactic information sequence may be determined based on the synonymous mapping relationships. Finally, the syntactic codeword may be modulated to obtain a signal vector.

13 Claims, 7 Drawing Sheets

ENCODING AND DECODING METHOD FOR SEMANTIC CHANNEL AND RELATED DEVICE

CROSS-REFERENCE TO RELATED APPLICATIONS

This application claims priority to Chinese Patent Application No. 202410090152.9, filed on Jan. 22, 2024, the content of which is incorporated herein by reference in its entirety.

TECHNICAL FIELD

The present application relates to encoding and decoding technology, in particular to an encoding method for semantic channels, a decoding method for semantic channels and related devices.

BACKGROUND

The performance of traditional communication technologies has already approached a theoretical limit under a guidance of the classical information theory-Shannon theory. Therefore, it is difficult to make significant breakthroughs. In order to meet high requirements for effectiveness and reliability in future wireless communication scenarios, new technologies are needed to make the breakthroughs. At present, semantic channel coding technologies may be potential approaches to breakthrough the limits of the Shannon theory. The semantic channel coding technologies are key technologies that can improve transmission rates. However, introductions of synonymous concepts in semantic communications have raised a research object from codewords to synonymous sets, which makes some analysis methods in traditional channel coding schemes no longer applicable. At the same time, there is no such a theory that can adapt existing channel encoding and decoding schemes from syntactic communication scenarios to semantic communication scenarios. Therefore, it is necessary to provide a theoretical guidance and design corresponding channel encoding and decoding schemes in the semantic communication scenarios.

SUMMARY

In view of the above, examples of the present disclosure provide an encoding and decoding method for semantic channels and related devices, to extend encoding and decoding methods for syntax channels to encoding and decoding methods for semantic channels, thereby reducing probabilities of errors in received semantic information in the semantic communication scenarios and achieving a reduction in a rate of erroneous semantic information.

In examples of the present disclosure, the encoding method for semantic channels may include: obtaining a semantic codebook and synonymous mapping relationships pre-established; determining a syntactic information sequence to be transmitted; determining a syntactic codeword from the semantic codebook corresponding to the syntactic information sequence based on the synonymous mapping relationships; and modulating the syntactic codeword to obtain a signal vector.

In examples of the present disclosure, the decoding method for semantic channels may include: obtaining a semantic codebook and synonymous mapping relationships pre-established; performing a signal recovery process on a signal vector received to obtain a sequence index of a target synonymous set according to the semantic codebook and a preset decoding criterion; determining a target syntactic information sequence set corresponding to the sequence index of the target synonymous set based on the synonymous mapping relationships; and selecting a target syntactic information sequence from the target syntactic information sequence set as an output result.

Examples of the present disclosure also provides an electronic device, which includes: a memory, a processor, and a computer program stored in the memory and executable on the processor. The processor executes the program to implement the encoding and decoding method for semantic channels described above.

Examples of the present disclosure also provide a non-transient computer-readable storage medium which stores computer instructions for causing a computer to execute the encoding and decoding method for semantic channels described above.

Examples of the present disclosure also provide a computer program product, comprising: computer instructions for causing a computer to execute the encoding and decoding method for semantic channels described above.

It can be seen that according to the encoding and decoding method for semantic channels and related devices, at a transmitter, a semantic codebook and synonymous mapping relationships pre-established can be obtained. Then a syntactic information sequence to be transmitted can be determined. Further, a syntactic codeword can be determined from the semantic codebook corresponding to the syntactic information sequence based on the synonymous mapping relationships. At last, the syntactic codeword can be modulated to obtain a signal vector. While at a receiver, a semantic codebook and synonymous mapping relationships pre-established can be also obtained. Then, a signal recovery process on a signal vector received is performed to obtain a sequence index of a target synonymous set according to the semantic codebook and a preset decoding criterion. Later, a target syntactic information sequence set corresponding to the sequence index of the target synonymous set can be determined based on the synonymous mapping relationships. At last, a syntactic information sequence can be selected from the target syntactic information sequence set as an output result.

From the above, a bridge between a syntax channel encoding and decoding scheme and a semantic channel encoding and decoding scheme can be built through synonymous mapping relationships which may extend encoding and decoding methods for syntax channels to encoding and decoding methods for semantic channels. By this bridge, a probability of errors in semantic information received in the semantic scenarios can be greatly reduced.

BRIEF DESCRIPTION OF THE DRAWINGS

In order to describe technical solutions of the present application or related arts more clearly, accompanying drawings required for describing examples or the related art are introduced briefly in the following. Apparently, the accompanying drawings in the following descriptions only illustrate some examples of the present application, and those of ordinary skill in the art may still derive other drawings from these drawings without creative efforts.

DETAILED DESCRIPTION OF THE EMBODIMENTS

Figure 1:
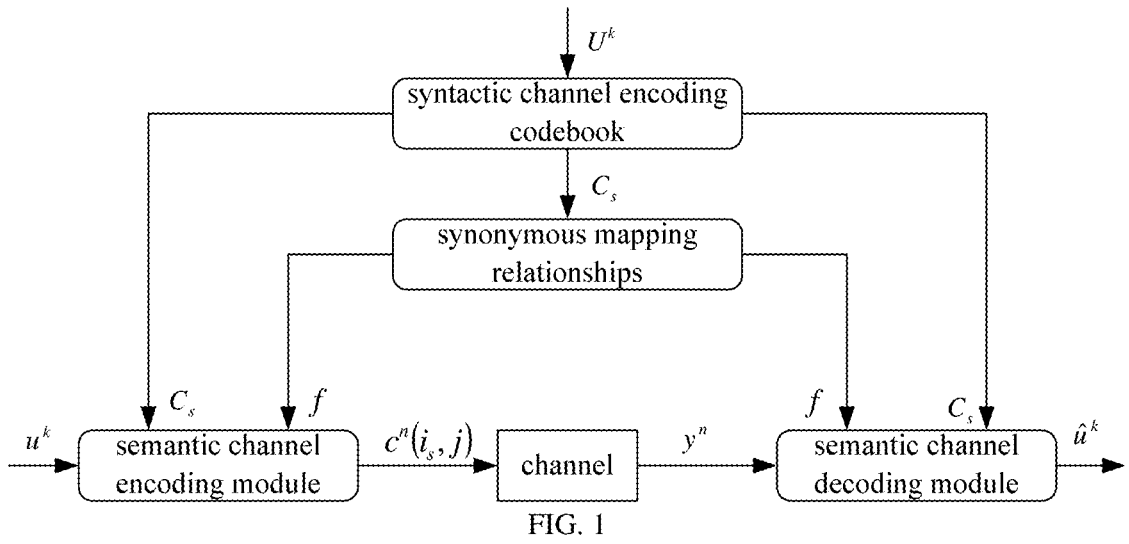
FIG. 1 is a schematic diagram of a communication system in a semantic communication scenario according to an example of the present disclosure.

Hereinafter, in order to make the objective(s), technical solution(s) and advantages of the present application clearer and more understandable, the present application will be further described in detail, in connection with specific embodiments and with reference to the accompanying drawings.

It is necessary to be noted that the technical terms or scientific terms used in the embodiments of the present application should have common meanings as understood by those skilled in the art of the present application, unless otherwise defined. The "first", "second" and similar words used in the embodiments of the present application do not refer to any sequence, number or importance, but are only used to distinguish different component portions. The "comprise", "include" or a similar word means that an element or item before such word covers an element or item or any equivalent thereof as listed after such word, without excluding other elements or items. The "connect" or "interconnect" or a similar word does not mean being limited to a physical or mechanical connection, but may include a direct or indirect electrical connection. The "upper", "lower", "left" and "right" are used only to indicate a relative position relation, and after the absolute position of the described object is changed, the relative position relation may be changed accordingly.

In the present disclosure, it should be understood that the number of any elements in the drawing is for illustration purposes only and not for limitation, and any nomenclature is for distinction only and does not have any restrictive meaning.

In communication technologies, a syntax channel communication model may include the following parts.

Source: a carrier that sends information, which can be simply understood as a transmitter of the information. A default output of the source is binary syntactic codewords.

Source encoder: an entity that performs a lossless encoding (or lossy encoding that meets preset requirements) on an output of the source to reduce redundancy of output information. Source encoding can be understood as compressing the source information.

Channel encoder: an entity that encodes an output of a source encoder to ensure that a resulting signal sequence can be transmitted accurately through a channel. Generally, redundancy may be added to enhance an anti-interference ability.

Channel: information can be transmitted in a channel and transmitted to a receiver.

Channel decoder: an entity that decodes a received signal sequence and can recover certain transmission errors.

Source decoder: an entity that decodes an output of a channel decoder to restore an original information sequence.

Therefore, in syntax communication technologies, an object encoded by a channel encoder may be a syntactic codeword. While through a semantic channel in semantic communications, an object encoded by a channel encoder may change from a syntactic codeword to a synonymous set composed of at least one syntactic codeword, making a conventional channel encoder in the syntax channel communication model no longer suitable for encoding any synonymous set. At the same time, a conventional channel decoder in a syntax channel communication model is also no longer suitable for decoding a synonymous set. Therefore, if conventional channel encoders or conventional channel decoders are used in the semantic communications, not only both the encoding and decoding accuracies would be lowered, but also the transmission accuracy of the semantic information would be lowered.

An indicator for evaluating a performance of the semantic channel encoding is Semantic Information Error Rate, which is a ratio of the number of semantic information sequences transmitted incorrectly to the total number of semantic information sequences transmitted. In a semantic information transmission process, if a syntactic information sequence recovered by a receiver and a syntactic information sequence sent by a transmitter are not in a same syntactic information sequence set after a synonymous mapping of semantic information, it may be determined that the transmission process has incorrectly transmitted semantic information. Where, the total number of semantic information sequences transmitted is the total number of semantic information sequences transmitted by the transmitter, and the number of semantic information sequences transmitted incorrectly is the number of transmission processes that have incorrectly transmitted semantic information.

Therefore, when a transmission object changes from a syntactic codeword to a synonymous set, conventional encoding and decoding methods in related communication technologies will lead to an increase in a rate of erroneous semantic information, resulting in frequent transmission errors of the semantic information.

In view of the above, examples of the present disclosure provide an encoding and decoding method for semantic channels and related devices. Specifically, at a transmitter, a semantic codebook and synonymous mapping relationships pre-established can be obtained. Then a syntactic information sequence to be transmitted can be determined. Further, a syntactic codeword can be determined from the semantic codebook corresponding to the syntactic information sequence based on the synonymous mapping relationships. At last, the syntactic codeword can be modulated to obtain a signal vector. While at a receiver, a semantic codebook and synonymous mapping relationships pre-established can be also obtained. Then, a signal recovery process on a signal vector is performed to obtain a sequence index of a target synonymous set according to the semantic codebook and the a preset decoding criterion. Later, a target syntactic information sequence set corresponding to the sequence index of the target synonymous set can be determined based on the synonymous mapping relationships. At last, a syntactic information sequence can be selected from the target syntactic information sequence set as an output result. In examples of the present disclosure, a bridge between a syntax channel encoding and decoding scheme and a semantic channel encoding and decoding scheme can be built through synonymous mapping relationships which may extend encoding and decoding methods of syntax channels to encoding and decoding methods of semantic channels. By this bridge, a probability of errors in semantic information received in the semantic scenarios can be greatly reduced.

The encoding and decoding methods of semantic channels according to examples of the present disclosure will be described below in conjunction with accompanying drawings.

In some examples of the present disclosure, the encoding and decoding methods of semantic channels may be applied to a communication system in a semantic communication scenario shown in FIG. 1. The communication system in a semantic communication scenario may include the following three modules: a relationship building module, a semantic channel encoding module and a semantic channel decoding module. The relationship building module is used for generating a semantic codebook and establishing synonymous mapping relationships. The semantic channel encoding module is used for performing a semantic channel encoding. The semantic channel decoding module is used for performing a semantic channel decoding.

In examples of the present disclosure, an input of the relationship building module may be a syntactic information sequence from a set of all possible syntactic information sequences. An output of the relationship building module may be a semantic codebook and synonymous mapping relationships established. The relationship building module is used to generate the semantic codebook, and establish synonymous mapping relationships between semantic information and syntactic information sequences. Specifically, the synonymous mapping relationships refer to mapping relationships established between sequence indexes of synonymous sets representing semantic information and syntactic information sequences. To be noted, the semantic codebook and the synonymous mapping relationships should be synchronized to the transmitter and the receiver.

An input of the semantic channel encoding module may include a syntactic information sequence and the output of the relationship building module (that is, the semantic codebook and the synonymous mapping relationships). An output of the semantic channel encoding module may be a syntactic codeword.

An input of the semantic channel decoding module may include a signal vector received and the output of the relationship building module (that is, the semantic codebook and the synonymous mapping relationships). An output of the semantic channel decoding module may be a syntactic information sequence.

Figure 2A:
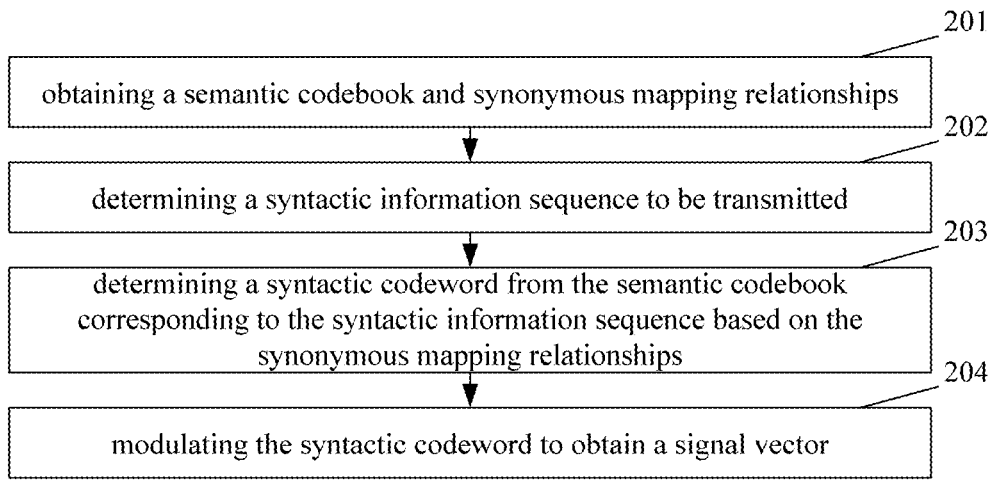
FIG. 2a is a flowchart of an encoding method for semantic channels according to an example of the present disclosure.

In some examples of the present disclosure, as shown in FIG. 2a, the encoding method for semantic channels may include the following steps.

In step 201, obtaining a semantic codebook and synonymous mapping relationships.

Figure 3A:
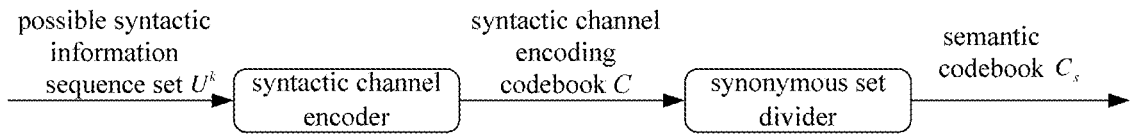
FIG. 3a is a flowchart of constructing a semantic codebook and synonymous mapping relationships according to an example of the present disclosure.
Figure 3B:
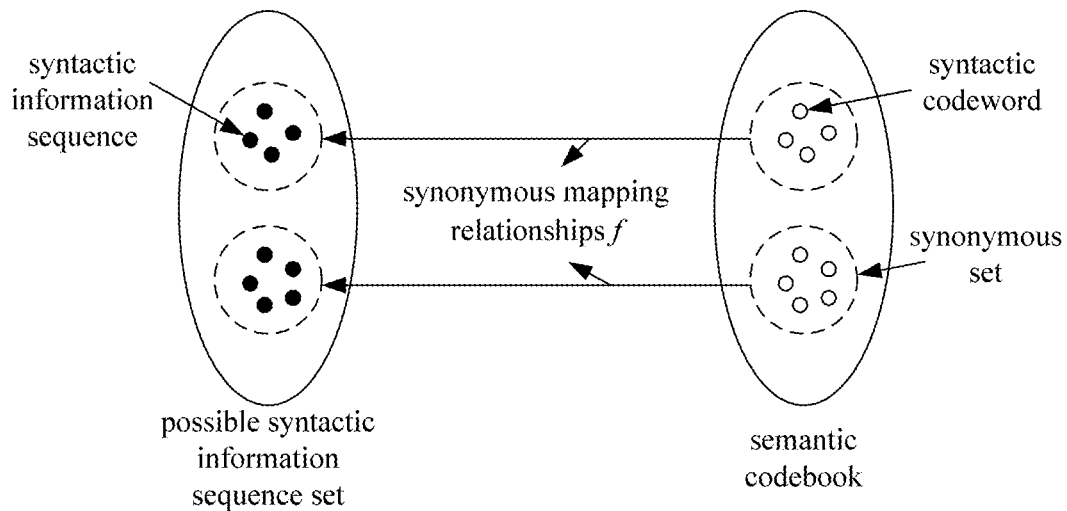
FIG. 3b is a schematic diagram illustrating the synonymous mapping relationships according to an example of the present disclosure.

In specific examples, as shown in FIG. 3a and FIG. 3b, the semantic codebook may be pre-established and include multiple elements. Each of these multiple elements may be a synonymous set representing semantic information, obtained by dividing syntactic codewords in a syntactic codebook into multiple sets based on a maximum Hamming distance criterion. After creating the semantic codebook, the synonymous mapping relationships can be constructed between sequence indexes of these synonymous sets and syntactic information sequences based on syntactic codewords contained in each synonymous set. Moreover, the semantic codebook and the synonymous mapping relationships may also be synchronized to both the transmitter and the receiver. In examples of the present disclosure, the synonymous mapping relationships between the sequence indexes of the synonymous sets and syntactic information sequences may be represented as a mapping f.

Specifically, $\tilde{N}$ may be used to represent the quantity of types of semantic information. N may be used to represent the quantity of syntactic codewords. In examples of the present disclosure, the syntactic codewords may be divided into $\tilde{N}$ synonymous sets. Where, the synonymous set with a sequence index of $i_s$ may contain $N_{i_s}$ syntactic codewords. Moreover, the synonymous set may be denoted as C. The synonymous set with a sequence index of $i_s$ may be denoted as $C_{i_s}$. Further, the $j^{th}$ syntactic codeword in the synonymous set $C_{i_s}$ may be denoted as c ($i_s$, j).

In step 202, determining a syntactic information sequence to be transmitted.

In step 203, determining a syntactic codeword from the semantic codebook corresponding to the syntactic information sequence based on the synonymous mapping relationships.

In step 204, modulating the syntactic codeword to obtain a signal vector.

Figure 4:
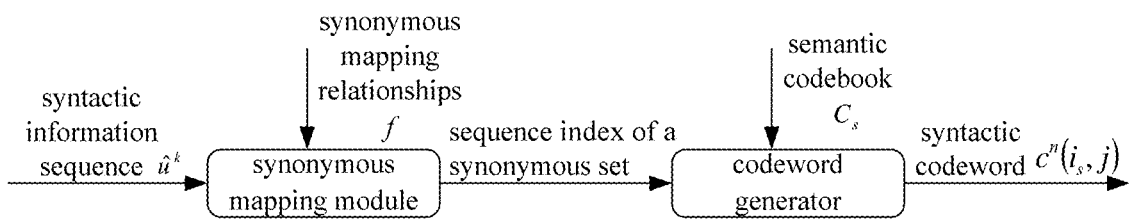
FIG. 4 is a schematic diagram illustrating an internal structure of a channel encoder in a semantic communication scenario according to an example of the present disclosure.

In specific examples, an encoding process at the transmitter is shown in FIG. 4. At the transmitter, semantic information may be extracted from a syntactic information sequence to be transmitted based on the synonymous mapping relationships. Then a syntactic codeword may be selected and used to carry the semantic information. The signal vector modulated from the syntactic codeword may be sent to the receiver through a channel.

Specifically, at first, the syntactic information sequence to be sent may be mapped to a sequence index of a synonymous set representing semantic information of the syntactic information sequence based on the synonymous mapping relationships received. Then, the synonymous set with the sequence index mapped may be found from the semantic codebook. Moreover, one syntactic codeword in the synonymous set may be selected as a transmission codeword randomly or according to a preset selection rule. Finally, the syntactic codeword may be modulated and transmitted to receiver through the channel.

For example, in some examples of the present disclosure, a preset selection rule may include: calculating a similarity between each syntactic codeword in the synonymous set and the semantic information of the syntactic information sequence to be transmitted (such as "happiness") respectively; and selecting a syntactic codeword with a highest similarity as the syntactic codeword to be modulated.

In some examples of the present disclosure, in the modulation process, an initial signal vector obtained by modulating the $j^{th}$ syntactic codeword with a length of n in the synonymous set $C_{i_s}$ may be denoted as $x^n$ ($i_s$, j), and $x^n$ for short. A signal obtained by modulating the $k^{th}$ code element of the $j^{th}$ syntactic codeword in the synonymous set $C_{i_s}$ may be denoted as $x^{(k)}$ ($i_s$, j). The initial signal vector $x^n$ may be superimposed with a noise $z^n$ of the channel, resulting in a final signal vector $y^n$. In this case, $y^n = x^n + z^n$.

Figure 2B:
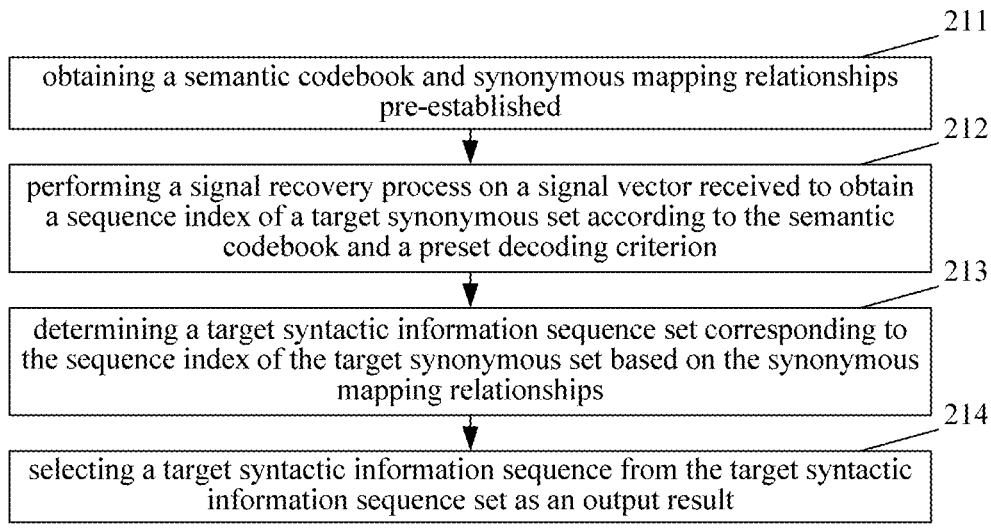
FIG. 2b is a flowchart of a decoding method for semantic channels according to an example of the present disclosure.

In some examples of the present disclosure, as shown in FIG. 2b, the decoding method for semantic channels may include the following steps.

In step 211, obtaining a semantic codebook and synonymous mapping relationships pre-established.

In step 212, performing a signal recovery process on a signal vector received to obtain a sequence index of a target synonymous set according to the semantic codebook and a preset decoding criterion.

In step 213, determining a target syntactic information sequence set corresponding to the sequence index of the target synonymous set based on the synonymous mapping relationships.

In step 214, selecting a target syntactic information sequence from the target syntactic information sequence set as an output result.

Figure 5:
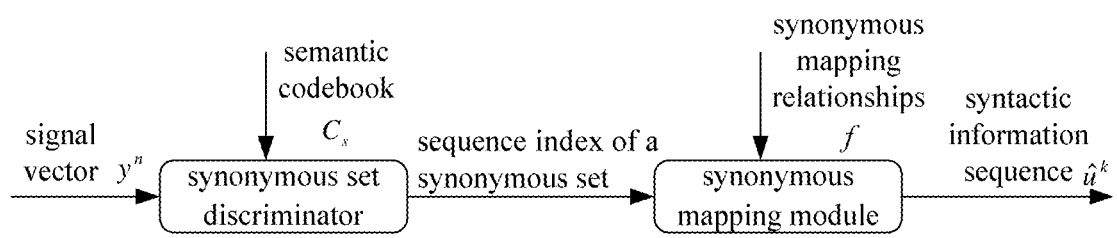
FIG. 5 is a schematic diagram illustrating an internal structure of a channel decoder in a semantic communication scenario according to an example of the present disclosure.

In specific examples, the decoding process at the receiver is shown in FIG. 5. At the receiver, a signal vector received may be judged directly as the most likely semantic information. Then, a syntactic information sequence carrying the most likely semantic information may be determined as an output result. Specifically, at first, the synonymous sets in the semantic codebook may be traversed. A target synonymous set corresponding to the most likely semantic information of the signal vector received may be selected using a maximum likelihood group decoding criterion. That is, the sequence index of the target synonymous set may be determined at first. Moreover, the sequence index of the target synonymous set may be mapped to a target syntactic information sequence set including syntactic information sequences based on the synonym mapping relationships. Then, the target syntactic information sequence can be selected from the target syntactic information sequence set as the output result, or the target syntactic information sequence can be selected from the target syntactic information sequence set as the output result according to a preset sequence selection rule. For example, the preset sequence selection rule may include: calculating a similarity between each syntactic information sequence in the target syntactic information sequence set and the most likely semantic information corresponding to the signal vector received, and selecting a syntactic information sequence with a highest similarity as the output result.

In view of the above, examples of the present disclosure provide an encoding and decoding method for semantic channels and related devices. Specifically, at a transmitter, a pre-built semantic codebook and synonymous mapping relationships can be obtained. Then a syntactic information sequence to be sent can be determined. Further, a syntactic codeword can be determined from the semantic codebook corresponding to the syntactic information sequence based on the synonymous mapping relationships. At last, the syntactic codeword can be modulated to obtain a signal vector. While at a receiver, a pre-built semantic codebook and synonymous mapping relationships can be also obtained. Then, a signal recovery processing on a signal vector is performed to obtain a sequence index of a target synonymous set representing semantic information according to the semantic codebook and the preset decoding criterion. Later, a target syntactic information sequence set corresponding to the sequence index of the target synonymous set can be determined based on the synonymous mapping relationships. At last, a syntactic information sequence can be selected from the target syntactic information sequence set as an output result. In examples of the present disclosure, a bridge between a syntax channel encoding and decoding scheme and a semantic channel encoding and decoding scheme can be built through synonymous mappings which may extend encoding and decoding methods for syntax channels to encoding and decoding methods for semantic channels. By this bridge, a probability of errors in semantic information received in the semantic scenarios can be greatly reduced.

Figure 6A:
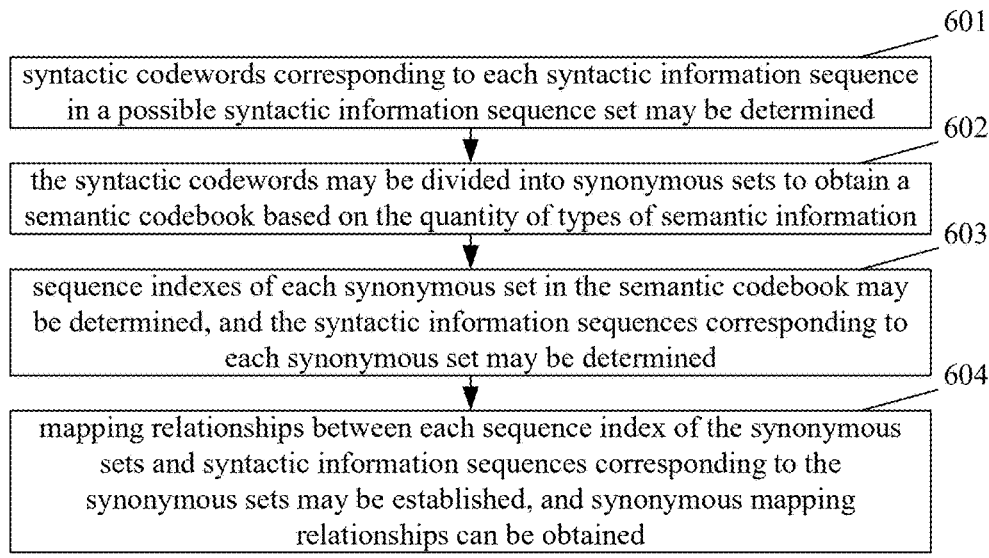
FIG. 6a is a flowchart of constructing a semantic codebook and synonymous mapping relationships according to an example of the present disclosure.

In some examples, as shown in FIG. 6a, the semantic codebook and the synonymous mapping relationships can be constructed through the following methods.

In Step 601, syntactic codewords corresponding to each syntactic information sequence in a possible syntactic information sequence set may be determined.

In specific examples, as shown in FIG. 3a and FIG. 3b, an input of a syntactic channel encoder may include all possible syntactic information sequences, that is, a possible syntactic information sequence set. In this step, each syntactic information sequence in the possible syntactic information sequence set may be encoded to obtain a corresponding syntactic codeword. That is, each syntactic information sequence in the possible syntactic information sequence set may corresponds to a syntactic codeword in a one-to-one mapping relationship. Therefore, an output of the syntactic channel encoder may be a syntactic channel encoding codebook containing all syntactic codewords. At the same time, in order to increase distances between partitioned synonymous sets, the syntactic channel coding method chosen should be able to maximize a minimum Hamming distance between the syntactic codewords.

Therefore, when creating a semantic codebook, it is necessary to determine the syntactic codeword corresponding to each syntactic information sequence in the possible syntactic information sequence set to obtain the syntactic channel encoding codebook. Further, the syntactic channel encoding codebook would be processed to obtain a corresponding semantic codebook, to extending a syntactic channel encoding scheme to a semantic channel encoding scheme.

In Step 602, the syntactic codewords may be divided into synonymous sets to obtain a semantic codebook based on the quantity of types of semantic information. Where, the syntactic codewords in a same synonymous set would represent a same type of semantic information.

In specific examples, as shown in FIG. 3a and FIG. 3b, a synonymous set divider may be used to divide the syntactic codewords in the syntactic channel encoding codebook into synonymous sets based on the quantity of types of the semantic information and the maximum Hamming distance between the synonymous sets. To be noted, syntactic codewords within a same synonymous set may represent a same type of semantic information. The output of the synonymous set divider may be the semantic codebook. As stated above, each element in the semantic codebook may be a synonymous set.

After constructing the semantic codebook, the synonymous mapping relationships will be further constructed through the following steps.

In Step 603, sequence indexes of each synonymous set in the semantic codebook may be determined, and the syntactic information sequences corresponding to each synonymous set may be determined. Where, the sequence index of the synonymous set corresponds one-to-one with a type of semantic information.

In specific examples, as shown in FIG. 3a and FIG. 3b, the synonymous mapping relationships may be established between the sequence indexes of the synonymous sets and the syntactic information sequences. Where, the synonymous mapping relationships need to ensure that each synonymous set corresponds to at least one syntactic information sequence, and the number of the syntactic codewords in a synonymous set should be the same as the number of syntactic information sequences corresponding to the synonymous set. To be noted, syntactic information sequences corresponding to a synonymous set may be grouped to form a syntactic information sequence set corresponding to the synonymous set.

First of all, it is necessary to determine a sequence index of each synonymous set in the semantic codebook, that is because the sequence index of a synonymous set is a representation of semantic information corresponding to the synonymous set. As stated above, the synonymous sets correspond one-to-one with one type of the semantic information.

After determining the sequence indexes of the synonymous sets, that is, data of one side of synonymous mapping relationships, it is necessary to determine data of the other side of the synonymous mapping relationships, that is, the syntactic information sequences corresponding to each synonymous set, because the synonymous mapping relationships are mapping relationships between the sequence indexes of the synonymous set and the syntactic information sequences.

For example, in examples of the present disclosure, synonymous syntactic codewords may be divided into a same synonymous set. These synonymous syntactic codewords express a same meaning but are different in syntax expressions. For example, if you want to express the semantics of "happiness", you can use the syntactic codewords corresponding to "happiness", the syntactic codewords corresponding to "gladness" and the syntactic codewords corresponding to "pleased". Then, find all the syntactic codewords expressing similar meanings of "happiness" to form a set, which is called a synonymous set. This synonymous set formed corresponds one-to-one with the semantic information of "happiness". Moreover, the synonymous set may correspond to a unique sequence index. Therefore, it is apparent that the sequence index of the synonymous set consisting of syntactic codewords expressing a meaning of "happiness" corresponds one-to-one with the semantic information of "happiness".

Moreover, the semantic information refers to an abstract concept because it is not a concrete sequence or a concrete codeword. Therefore, in examples of the present disclosure, the sequence index of a synonymous set is a representation of semantic information corresponding to the synonymous set.

In step 604, mapping relationships between each sequence index of the synonymous sets and syntactic information sequences corresponding to the synonymous sets may be established. In this way, synonymous mapping relationships can be obtained.

In specific examples, a synonymous mapping relationship refers to a mapping relationship between a sequence index of a synonymous set representing a type of semantic information and syntactic information sequences corresponding to the type of semantic information.

Figure 6B:
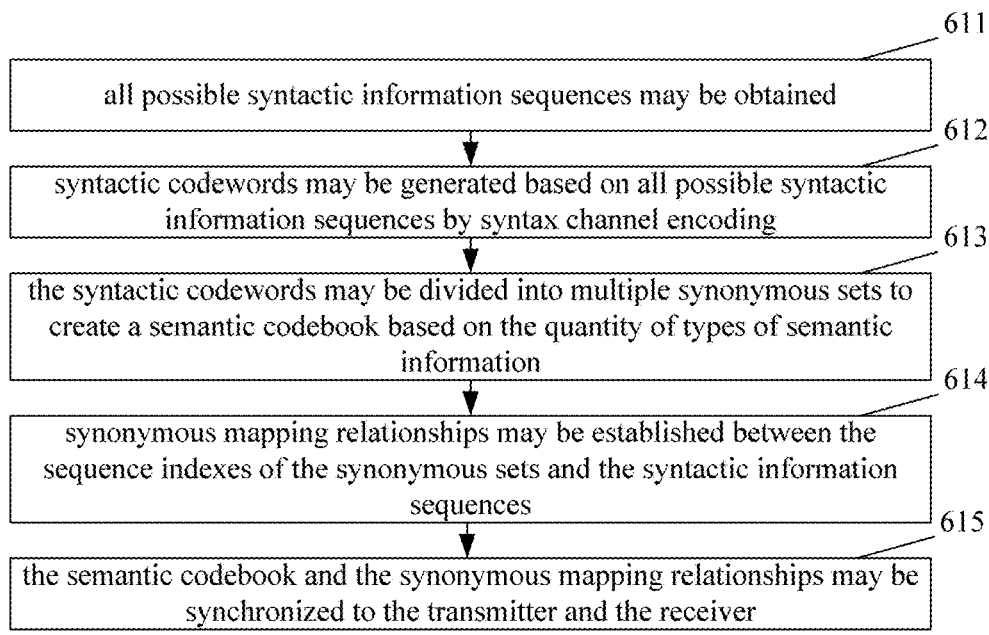
FIG. 6b is a flowchart of constructing a semantic codebook and synonymous mapping relationships according to another example of the present disclosure.

In summary, as shown in FIG. 6b, a specific process of establishing synonymous mapping relationships may include the following steps.

In step 611, all possible syntactic information sequences (i.e., the possible syntactic information sequence set) may be obtained.

In step 612, syntactic codewords may be generated based on all possible syntactic information sequences by syntax channel encoding. Where, the syntax channel coding scheme may be used to encode a syntactic information sequence with a length of k into a syntactic codeword with a length of n. To be noted, there is a one-to-one mapping relationship between the syntactic information sequence and the syntactic codeword.

In step 613, the syntactic codewords may be divided into multiple synonymous sets to create a semantic codebook based on the quantity of types of semantic information. Where, the synonymous sets in the semantic codebook need to satisfy that any two synonymous sets do not intersect, and the union of the syntactic codewords in all synonymous sets is all syntactic codewords, that is, $\forall_{i_s} \neq j_s$, $C_{i_s} \cap C_{i_s} = \Pi$, $\cup_{i_s}^{N_{i_s}} C_{i_s} = C$, $\Sigma_{i_s=1}^{\bar{N}} N_{i_s} = N$.

To be noted, a Hamming distance between any two synonymous sets may be calculated. The formula for calculating the Hamming distance between the synonymous set with a sequence index $i_s$ and the synonymous set with a sequence index $j_s$ may be denoted as the following.

$$d_{GH}(C_{i_s}, C_{j_s}) = \min_m \frac{\left[ \sum_{l=1}^{2^{nR_s}} d_H(c^n(i_s, m), c^n(j_s, l)) - \sum_{l=1, l \neq m}^{2^{nR_s}} d_H(c^n(i_s, m), c^n(i_s, l)) \right]^2}{\left\| \sum_{l=1}^{2^{nR_s}} (c^n(j_s, l) - c^n(i_s, l)) \right\|^2}$$

The minimum Hamming distance between the synonymous sets in the semantic codebook is denoted as $$d_{GH,min} = \min_{i_s \neq j_s} d_{GH}(C_{i_s}, C_{j_s}).$$

In order to maximize an average decision domain of each synonymous set, it is necessary to maximize the minimum Hamming distance between the synonymous sets in the semantic codebook. Therefore, the method chosen to partition synonymous sets must satisfy the requirement of maximizing the minimum Hamming distance $d_{GH,min}$ between the synonymous sets in the semantic codebook given the number of pieces of the semantics.

In step 614, synonymous mapping relationships may be established between the sequence indexes of the synonymous sets and the syntactic information sequences.

For any synonymous set, the mappings from its sequence index to all syntactic codewords within the synonymous set are definite mapping relationships. Moreover, each syntactic codeword corresponds one-to-one to a syntactic information sequence. Therefore, through the transition of syntactic codewords, there exists definite mapping relationships between the sequence index of a synonymous set and the syntactic information sequences corresponding to the syntactic codewords within the synonymous set. Therefore, when traversing all the synonymous sets, synonymous mapping relationships between the sequence indexes of the synonymous sets and the syntactic information sequences can be constructed.

In step 615, the semantic codebook and the synonymous mapping relationships may be synchronized to the transmitter and the receiver.

It should be noted that after generating the semantic codebook and establishing the synonymous mapping relationships between the semantic information and the syntactic information, the semantic codebook and the synonymous mapping relationships should be synchronized to the transmitter and the receiver. In this case, the transmitter can implement semantic channel encoding based on the semantic codebook and the synonymous mapping relationships. Moreover, the receiver can implement semantic channel decoding based on the semantic codebook and the synonymous mapping relationships.

Figure 7A:
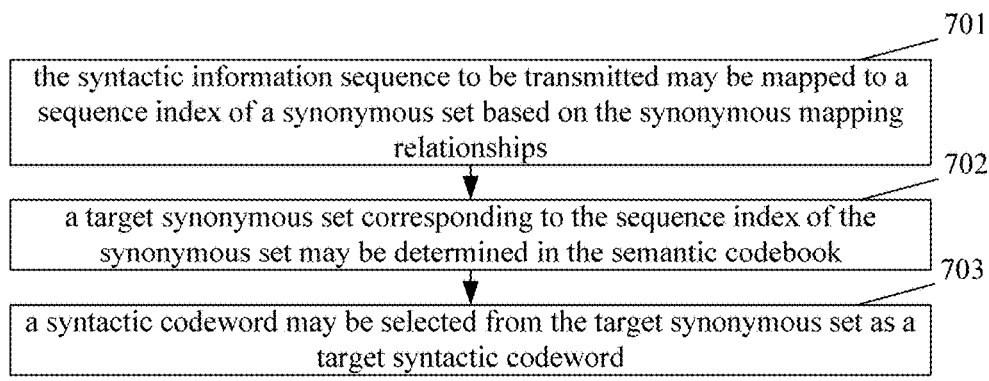
FIG. 7a is a flowchart for determining a syntactic codeword corresponding to a syntactic information sequence according to an example of the present disclosure.

In some examples, as shown in FIG. 7a, the method of determining the syntactic codeword in the semantic codebook corresponding to the syntactic information sequence based on the synonymous mapping relationships may include the following steps.

In Step 701, the syntactic information sequence to be transmitted may be mapped to a sequence index of a synonymous set based on the synonymous mapping relationships.

In specific examples, as shown in FIG. 4, the input of a synonymous mapping module is a syntactic information sequence, the semantic codebook and the synonym mapping relationships output from the relationship building module. The output of the synonymous mapping module is a sequence index of a synonymous set corresponding to the syntactic information sequence to be transmitted. In this step, the syntactic information sequence to be transmitted can be mapped to a sequence index of a synonymous set based on the synonymous mapping relationships.

For example, if the syntactic information sequence to be transmitted is a sequence representing "happiness", according to the synonymous mapping relationships, the sequence index of the synonymous set expressing the semantic information of "happiness" can be determined by using the syntactic codeword expressing the semantic information of "happiness" as a transition.

In step 702, a target synonymous set corresponding to the sequence index of the synonymous set may be determined in the semantic codebook.

In specific implementations, as shown in FIG. 4, an input of a codeword generator may be a sequence index of a synonymous set and the semantic codebook output by the synonymous mapping module. The output of the codeword generator may be a syntactic codeword. Due to the one-to-one corresponding relationships between the synonymous sets and the sequence indexes of the synonymous sets, after determining a sequence index of a synonymous set, the target synonymous set can be determined in the semantic codebook. For example, the target synonymous set composed of all syntactic codewords expressing "happiness" may be determined based on the sequence index of the synonymous set expressing the semantic information of "happiness".

In step 703, a syntactic codeword may be selected from the target synonymous set as a target syntactic codeword.

In specific implementations, after determining the target synonymous set, since the target synonymous set is composed of multiple syntactic codewords expressing the same semantic information, a syntactic codeword in the target synonymous set can be selected as the target syntactic codeword.

Figure 7B:
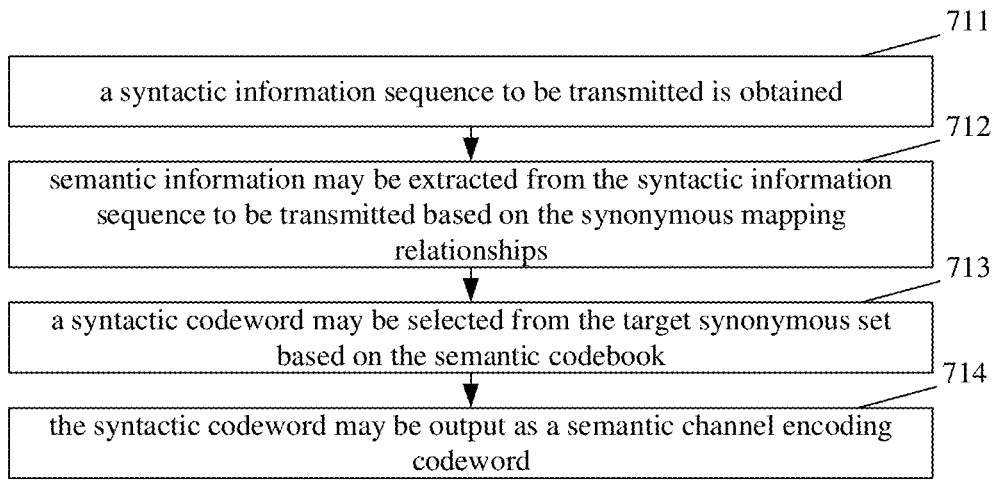
FIG. 7b is a flowchart of semantic channel encoding according to an example of the present disclosure.

As shown in FIG. 7b, a processing flow of the semantic channel encoding may include the following steps.

In step 711, a syntactic information sequence to be transmitted is obtained.

In step 712, semantic information may be extracted from the syntactic information sequence to be transmitted based on the synonymous mapping relationships.

Based on the synonymous mapping relationships between the sequence indexes of the synonymous sets and the syntactic information sequences, the syntactic information sequence to be transmitted can be mapped to a sequence index of a target synonymous set. In this way, the extraction of semantic information corresponding to the syntactic information sequence can be achieved.

In step 713, a syntactic codeword may be selected from the target synonymous set based on the semantic codebook.

In step 714, the syntactic codeword may be output as a semantic channel encoding codeword.

In the above method, any syntactic codeword can be chosen from the target synonymous set as the semantic channel encoding codeword. Alternatively, based on prior information, a syntactic codeword can be selected as the semantic channel encoding codeword from the target synonymous set according to a preset selection rule. For example, the preset selection rule may include calculating the similarity between each syntactic codeword in the target synonymous set and the semantic information extracted from the syntactic information sequence to be transmitted (such as "happiness"), and selecting a syntactic codeword with a highest similarity.

In some examples, the semantic channel decoding process may be applicable to semantic communication scenarios where there is a discrete memoryless channel and the receiver knows the channel state information. As shown in FIG. 5, in the semantic channel decoding process, an input of a synonymous set discriminator may be a signal vector received from a channel and the semantic codebook output from the synonymous mapping module. The output of the synonymous set discriminator may be a sequence index of a synonymous set. Suitable decoding criteria need to be used in the synonymous set discriminator to match the partitioning of synonymous sets in semantic channel encoding. The decoding criteria may include: a maximum likelihood group decoding criterion, a logarithmic maximum likelihood group decoding criterion, a minimum group Euclidean distance decoding criterion, a minimum group Hamming distance decoding criterion, and a maximum correlation criterion. The maximum likelihood group decoding criterion is a core criterion, while the other decoding criteria may be regarded as equivalent criteria of the maximum likelihood group decoding criterion under different conditions.

In examples of the present disclosure, an input of a synonymous mapping module may be a sequence index of a synonymous set and the synonymous mapping relationships. An output of the synonymous mapping module may be a syntactic information sequence. It should be noted that although there are synonymous mapping modules in both the semantic channel encoding module and the semantic channel decoding module, these synonymous mapping modules are not exactly the same. The synonymous mapping module in the semantic channel encoding module maps a syntactic information sequence to a sequence index of a synonymous set. The mapping result is deterministic. However, the synonymous mapping module in the semantic channel decoding module maps a sequence index of a synonymous set to a syntactic information sequence. The mapping result is not deterministic.

Figure 8:
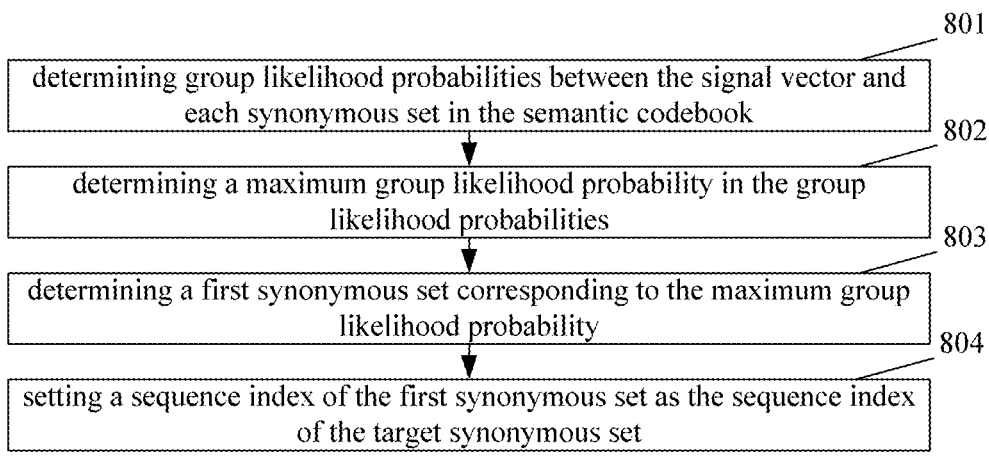
FIG. 8 is a flowchart of a signal recovery process according to an example of the present disclosure.

In some examples, the decoding criterion may include the maximum likelihood group decoding criterion. As shown in FIG. 8, the signal vector is subjected to the signal recovery process based on the semantic codebook and the preset decoding criterion to obtain the sequence index of the target synonymous set. The signal recovery process may include the following steps.

In step 801, determining group likelihood probabilities between the signal vector and each synonymous set in the semantic codebook.

In step 802, determining a maximum group likelihood probability in the group likelihood probabilities.

In step 803, determining a first synonymous set corresponding to the maximum group likelihood probability.

In step 804, setting a sequence index of the first synonymous set as the sequence index of the target synonymous set.

In specific implementations, the semantic channel decoding process based on the maximum likelihood group decoding criterion may include the following steps. After receiving the signal vector $y^n$ from the channel, a synonymous set may be selected from the semantic codebook one by one. Then, a group likelihood probability may be calculated between the synonymous set and the signal vector. In response to determining that the group likelihood probability is a current maximum group likelihood probability, the sequence index of the synonymous set may be recorded. In response to determining that all synonymous sets in the semantic codebook have been traversed, output the maximum group likelihood probability, and set the sequence index $\hat{i}_s$ of the synonymous set corresponding to the maximum group likelihood probability as the sequence index $\hat{i}_s$ of the target synonymous set. In response to determining that not all synonymous sets in the semantic codebook have been traversed, return to the step of selecting a synonymous set from the semantic codebook.

To be specific, the group likelihood probability between the synonymous set with a sequence index of $i_s$ and the signal vector may be calculated based on the following equation.

$$p(y^n | C_{i_s}) = \left( \prod_{j=1}^{N_{i_s}} p(y^n | x^n(i_s, j)) \right)^{\frac{1}{N_{i_s}}} = \left( \prod_{j=1}^{N_{i_s}} \prod_{k=1}^{n} p(y^{(k)} | x^{(k)}(i_s, j)) \right)^{\frac{1}{N_{i_s}}}$$

In the above method, the synonymous set with a maximum group likelihood probability in the Ñ synonymous sets obtained above may be selected as the first synonymous set. Further, the sequence index of the first synonymous set may be determined as the sequence index of the target synonymous set. That is, the sequence index $$\hat{i}_s = \underset{i_s}{\mathrm{argmax}}\, p(y^n | C_{i_s})$$

of the target synonymous set may be used as a decision result of the synonymous set discriminator.

Further, a synonymous mapping module may be used to map the sequence index $\hat{i}_s$ of the target synonymous set into a syntactic information sequence. According to the one-to-one mapping rules between the semantic information and the sequence index of the synonymous set, the sequence index $\hat{i}_s$ of the target synonymous set may represent the target semantic information. In examples of the present disclosure, a syntactic codeword $x^n (i_s, j)$ from the target synonymous set $C_{\hat{i}_s}$ may be selected randomly or according to a preset selection rule based on prior information. Further, the syntactic codeword $x^n (i_s, j)$ may be converted to a syntactic information sequence $\hat{u}^k$. The syntactic information sequence $\hat{u}^k$ may be an output result of the semantic channel decoder.

Figure 9:
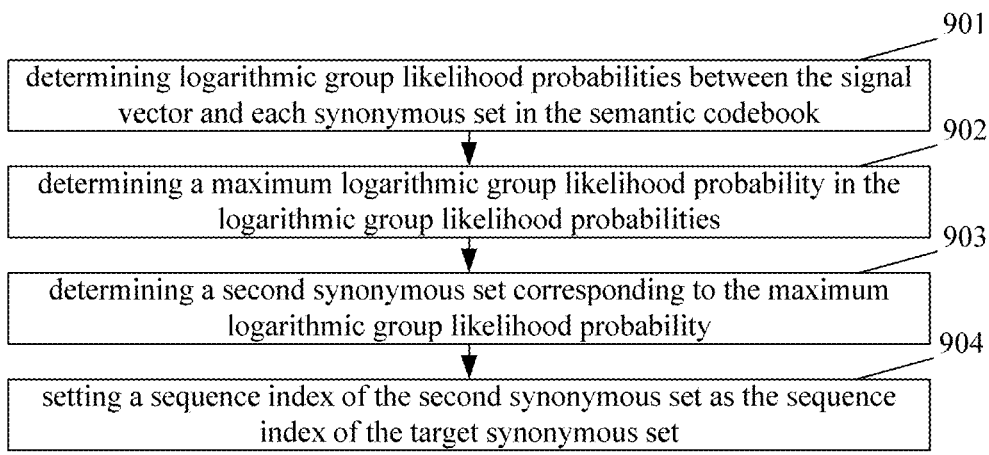
FIG. 9 is a flowchart of semantic channel decoding based on a logarithmic maximum likelihood group decoding criterion according to an example of the present disclosure.

In some examples, the decoding criterion may include the logarithmic maximum likelihood group decoding criterion. As shown in FIG. 9, the signal vector is subjected to the signal recovery process based on the semantic codebook and the preset decoding criterion to obtain the sequence index of the target synonymous set. The signal recovery process may include the following steps.

In step 901, determining logarithmic group likelihood probabilities between the signal vector and each synonymous set in the semantic codebook.

In step 902, determining a maximum logarithmic group likelihood probability in the logarithmic group likelihood probabilities.

In step 903, determining a second synonymous set corresponding to the maximum logarithmic group likelihood probability.

In step 904, setting a sequence index of the second synonymous set as the sequence index of the target synonymous set.

In specific implementations, the semantic channel decoding process based on the maximum logarithmic likelihood group decoding criterion may include the following steps.

After receiving the signal vector $y^n$ from the channel, a synonymous set may be selected from the semantic codebook one by one. Then, a logarithmic group likelihood probability may be calculated between the synonymous set and the signal vector. In response to determining that the logarithmic group likelihood probability is a current maximum logarithmic group likelihood probability, the sequence index of the synonymous set may be recorded. In response to determining that all synonymous sets in the semantic codebook have been traversed, output the maximum logarithmic group likelihood probability, and set the sequence index $\hat{i}_s$ of the synonymous set corresponding to the maximum group likelihood probability as the sequence index $\hat{i}_s$ of the target synonymous set. In response to determining that not all synonymous sets in the semantic codebook have been traversed, return to the step of selecting a synonymous set from the semantic codebook.

To be specific, the logarithmic group likelihood probability between the synonymous set with a sequence index of $i_s$ and the signal vector may be calculated based on the following equation.

$$\ln p(y^n \mid C_{i_s}) = \frac{1}{N_{i_s}} \sum_{j=1}^{N_{i_s}} \ln p(y^n \mid x^n(i_s, j)) = \frac{1}{N_{i_s}} \sum_{j=1}^{N_{i_s}} \sum_{k=1}^{n} \ln p(y^{(k)} \mid x^{(k)}(i_s, j))$$

In the above method, the synonymous set with a maximum logarithmic group likelihood probability in the $\tilde{N}$ synonymous sets obtained above may be selected as the second synonymous set. Further, the sequence index of the second synonymous set may be determined as the sequence index of the target synonymous set. That is, the sequence index $$\hat{i}_s = \underset{i_s}{\operatorname{argmax}} \ln p(y^n \mid C_{i_s})$$

of the target synonymous set may be used as a decision result of the synonymous set discriminator.

It should be noted that the logarithmic maximum likelihood group decoding criterion is no different essentially from the maximum likelihood group decoding criterion. However, in some examples, the length of the syntactic codeword is relatively long, resulting in a lower probability of calculated group likelihood, which can easily lead to an overflow during hardware operations. The logarithmic maximum likelihood group decoding criterion can effectively avoid the problem of overflow during the operation process.

Figure 10:
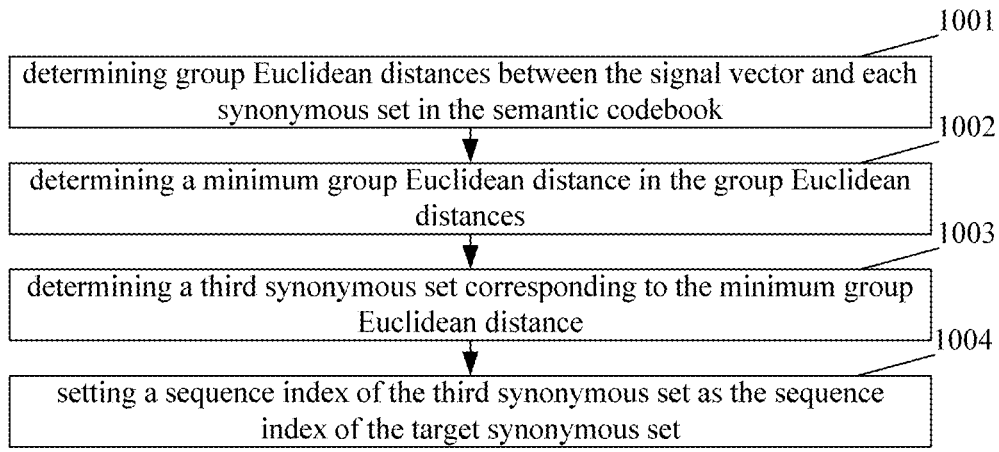
FIG. 10 is a flowchart of semantic channel decoding based on a minimum group Euclidean distance decoding criterion according to an example of the present disclosure.

In some examples, the decoding criterion may include the minimum group Euclidean distance decoding criterion. As shown in FIG. 10, the signal vector is subjected to the signal recovery process based on the semantic codebook and the preset decoding criterion to obtain the sequence index of the target synonymous set. The signal recovery process may include the following steps.

In step 1001, determining group Euclidean distances between the signal vector and each synonymous set in the semantic codebook.

In step 1002, determining a minimum group Euclidean distance in the group Euclidean distances.

In step 1003, determining a third synonymous set corresponding to the minimum group Euclidean distance.

In step 1004, setting a sequence index of the third synonymous set as the sequence index of the target synonymous set.

In specific implementations, the semantic channel decoding process based on the minimum group Euclidean distance decoding criterion may include the following steps.

After receiving the signal vector $y^n$ from the channel, a synonymous set may be selected from the semantic codebook one by one. Then, a group Euclidean distance may be calculated between the synonymous set and the signal vector. In response to determining that the group Euclidean distance is a current minimum group Euclidean distance, the sequence index of the synonymous set may be recorded. In response to determining that all synonymous sets in the semantic codebook have been traversed, output the minimum group Euclidean distance, and set the sequence index $\hat{i}_s$ of the synonymous set corresponding to the minimum group Euclidean distance as the sequence index $\hat{i}_s$ of the target synonymous set. In response to determining that not all synonymous sets in the semantic codebook have been traversed, return to the step of selecting a synonymous set from the semantic codebook.

To be specific, the group Euclidean distance between the synonymous set with a sequence index of is and the signal vector may be calculated based on the following equation.

$$d(y^n, C_{i_s}) = \frac{1}{N_{i_s}} \sum_{j=1}^{N_{i_s}} d(y^n, x^n(i_s, j)) = \frac{1}{N_{i_s}} \sum_{j=1}^{N_{i_s}} \sum_{k=1}^{n} (y^{(k)} - x^{(k)}(i_s, j))^2$$

In the above method, the synonymous set with a minimum group Euclidean distance in the $\tilde{N}$ synonymous sets obtained above may be selected as the third synonymous set. Further, the sequence index of the third synonymous set may be determined as the sequence index of the target synonymous set. That is, the sequence index $$\hat{i}_s = \underset{i_s}{\operatorname{argmax}} d(y^n, C_{i_s})$$

of the target synonymous set may be used as a decision result of the synonymous set discriminator.

It should be noted that the minimum group Euclidean distance decoding criterion is an equivalent of the maximum likelihood group decoding criterion under a condition of additive Gaussian white noise channel (AWGN).

Figure 11:
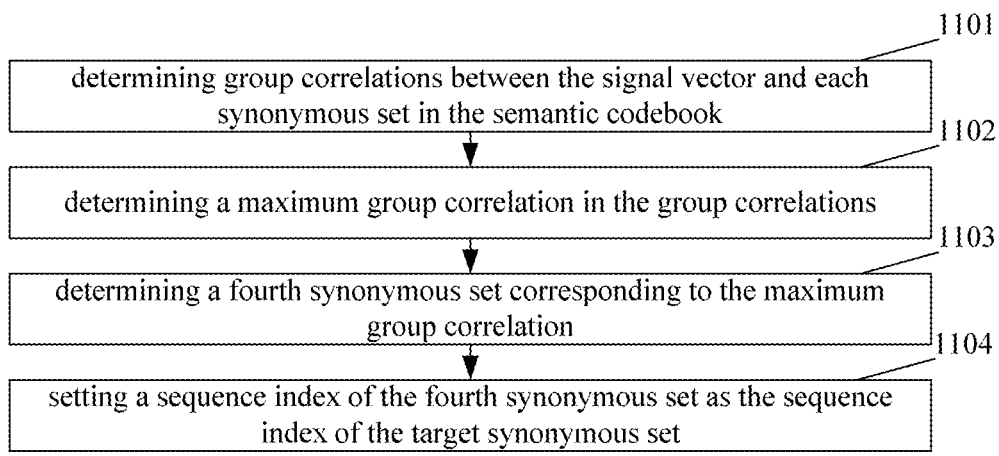
FIG. 11 is a flowchart of semantic channel decoding based on a maximum group correlation decoding criterion according to an example of the present disclosure.

In some examples, the decoding criterion may include the maximum group correlation decoding criterion. As shown in FIG. 11, the signal vector is subjected to the signal recovery process based on the semantic codebook and the preset decoding criterion to obtain the sequence index of the target synonymous set. The signal recovery process may include the following steps.

In step 1101, determining group correlations between the signal vector and each synonymous set in the semantic codebook.

In step 1102, determining a maximum group correlation in the group correlations.

In step 1103, determining a fourth synonymous set corresponding to the maximum group correlation.

In step 1104, setting a sequence index of the fourth synonymous set as the sequence index of the target synonymous set.

In specific implementations, the semantic channel decoding process based on the maximum group correlation decoding criterion may include the following steps.

After receiving the signal vector $y^n$ from the channel, a synonymous set may be selected from the semantic codebook one by one. Then, a group correlation may be calculated between the synonymous set and the signal vector. In response to determining that the group correlation is a current maximum group correlation, the sequence index of the synonymous set may be recorded. In response to determining that all synonymous sets in the semantic codebook have been traversed, output the maximum group correlation, and set the sequence index $\hat{i}_s$ of the synonymous set corresponding to the maximum group correlation as the sequence index $\hat{i}_s$ of the target synonymous set. In response to determining that not all synonymous sets in the semantic codebook have been traversed, return to the step of selecting a synonymous set from the semantic codebook.

To be specific, the group correlation between the synonymous set with a sequence index of $i_s$ and the signal vector may be calculated based on the following equation.

$$\langle Y, C_{i_s} \rangle = \frac{1}{N_{i_s}} \sum_{j=1}^{N_{i_s}} \sum_{k=1}^{n} y^{(k)} x^{(k)}(i_s, j)$$

In the above method, the synonymous set with a maximum group correlation in the $\tilde{N}$ synonymous sets obtained above may be selected as the fourth synonymous set. Further, the sequence index of the fourth synonymous set may be determined as the sequence index of the target synonymous set. That is, the sequence index $$\hat{i}_s = \underset{i_s}{\mathrm{argmax}} \langle Y, C_{i_s} \rangle$$

of the target synonymous set may be used as a decision result of the synonymous set discriminator.

It should be noted that the maximum group correlation decoding criterion is an equivalent of the maximum likelihood group decoding criterion under the conditions of additive Gaussian white noise channel (AWGN) and normalized transmission signal energy.

Figure 12:
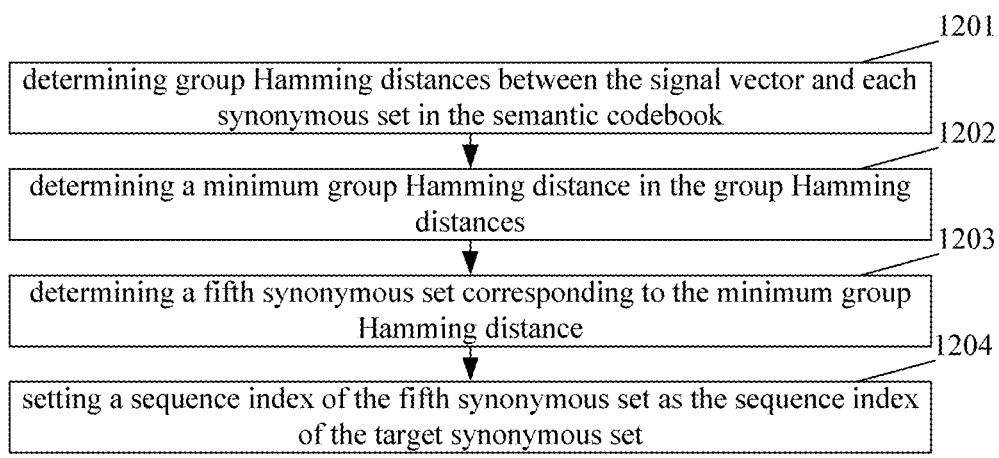
FIG. 12 is a flowchart of semantic channel decoding based on a minimum group Hamming distance decoding criterion according to an example of the present disclosure.

In some examples, the decoding criterion may include the minimum group Hamming distance decoding criterion. As shown in FIG. 12, the signal vector is subjected to the signal recovery process based on the semantic codebook and the preset decoding criterion to obtain the sequence index of the target synonymous set. The signal recovery process may include the following steps.

In step 1201, determining group Hamming distances between the signal vector and each synonymous set in the semantic codebook.

In step 1202, determining a minimum group Hamming distance in the group Hamming distances.

In step 1203, determining a fifth synonymous set corresponding to the minimum group Hamming distance.

In step 1204, setting a sequence index of the fifth synonymous set as the sequence index of the target synonymous set.

In specific implementations, the semantic channel decoding process based on the minimum group Hamming distance decoding criterion may include the following steps.

After receiving the signal vector $y^n$ from the channel, a synonymous set may be selected from the semantic codebook one by one. Then, a group Hamming distance may be calculated between the synonymous set and the signal vector. In response to determining that the group Hamming distance is a current minimum group Hamming distance, the sequence index of the synonymous set may be recorded. In response to determining that all synonymous sets in the semantic codebook have been traversed, output the group Hamming distance, and set the sequence index $\hat{i}_s$ of the synonymous set corresponding to the minimum group Hamming distance as the sequence index $\hat{i}_s$ of the target synonymous set. In response to determining that not all synonymous sets in the semantic codebook have been traversed, return to the step of selecting a synonymous set from the semantic codebook.

To be specific, the group Hamming distance between the synonymous set with a sequence index of $i_s$ and the signal vector may be calculated based on the following equation.

$$d_H(y^n, C_{i_s}) = \frac{1}{N_{i_s}} \sum_{j=1}^{N_{i_s}} d_H(y^n, c^n(i_s, j))$$

In the above method, the synonymous set with a minimum group Hamming distance in the $\tilde{N}$ synonymous sets obtained above may be selected as the fifth synonymous set. Further, the sequence index of the fifth synonymous set may be determined as the sequence index of the target synonymous set. That is, the sequence index $$\hat{i}_s = \underset{i_s}{\mathrm{argmax}} d_H(y^n, C_{i_s})$$

of the target synonymous set may be used as a decision result of the synonymous set discriminator.

It should be noted that the minimum group Hamming distance decoding criterion is an equivalent of the maximum likelihood group decoding criterion under binary symmetric channel (BSC) conditions.

Figure 13:
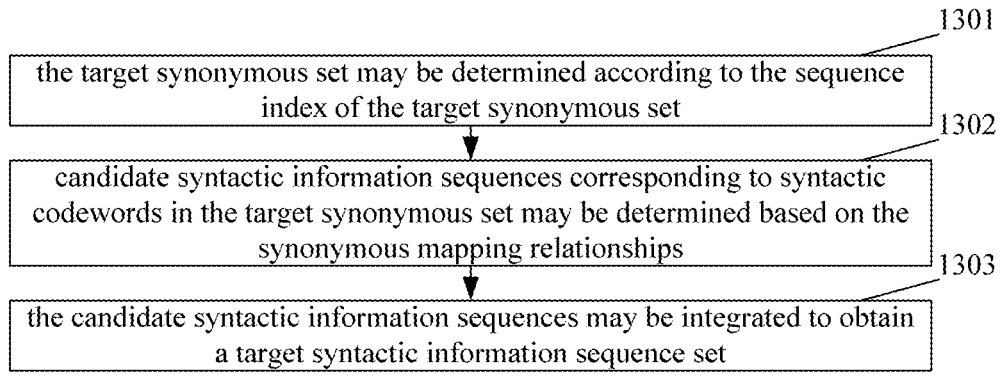
FIG. 13 is a flowchart for determining a target syntactic information sequence set according to an example of the present disclosure.

In some examples, as shown in FIG. 13, a target syntactic information sequence set corresponding to the sequence index of the target synonymous set may be determined based on the synonymous mapping relationships. The method of determining the target syntactic information sequence set corresponding to the sequence index of the target synonymous set may include the following steps.

In step 1301, the target synonymous set may be determined according to the sequence index of the target synonymous set.

In specific implementations, based on the one-to-one mapping relationship between synonymous sets and sequence indexes of the synonymous set, the target synonymous set $C_{\hat{i}_s}$ corresponding to the sequence index $\hat{i}_s$ of the target synonymous set can be determined.

In step 1302, candidate syntactic information sequences corresponding to syntactic codewords in the target synonymous set may be determined based on the synonymous mapping relationships.

In step 1303, the candidate syntactic information sequences may be integrated to obtain a target syntactic information sequence set.

In specific implementations, the candidate syntactic information sequence corresponding to each syntactic codeword in the target synonymous set $C_{\hat{i}_s}$ may be determined based on the synonymous mapping relationships. Moreover, the candidate syntactic information sequences may be integrated to obtain the target syntactic information sequence set. Then, a syntactic information sequence $\hat{u}^k$ in the target syntactic information sequence set may be selected as the output result of the semantic channel decoder, that is, the target syntactic information sequence.

Specifically, a syntactic codeword can be randomly selected from the synonymous set or can be selected from the synonymous set according to a preset selection rule based on prior information. The syntactic codeword can then be mapped to a syntactic information sequence which is used as the output result of the semantic channel decoder.

Verification results of the encoding and decoding methods for semantic channels provided by examples of the present disclosure are provided below.

The selected scenario of this example is a semantic communication scenario where the encoded symbols are binary symbols, the modulation method is BPSK, and both the transmitter and the receiver know the channel state information under discrete memoryless channel conditions. The selected syntactic channel encoding method is polar code encoding. The length of a syntactic codeword is 8 bits. The length of a syntactic information sequence is 4 bits.

There are a total of 8 kinds of semantic information. Therefore, there are 8 synonymous sets. Each synonymous set contains 2 syntactic codewords, and the minimum Hamming distance between the synonymous sets is 2. The average symbol power of the syntactic information sequence during transmission is set to 1. The average range of noise power in the channel is [0.1585, 2.512], that is, the received signal-to-noise ratio range is between-4 dB to 8 dB. The metric for evaluating the performance of semantic channel encoding is set as the false semantic information rate.

Figure 14:
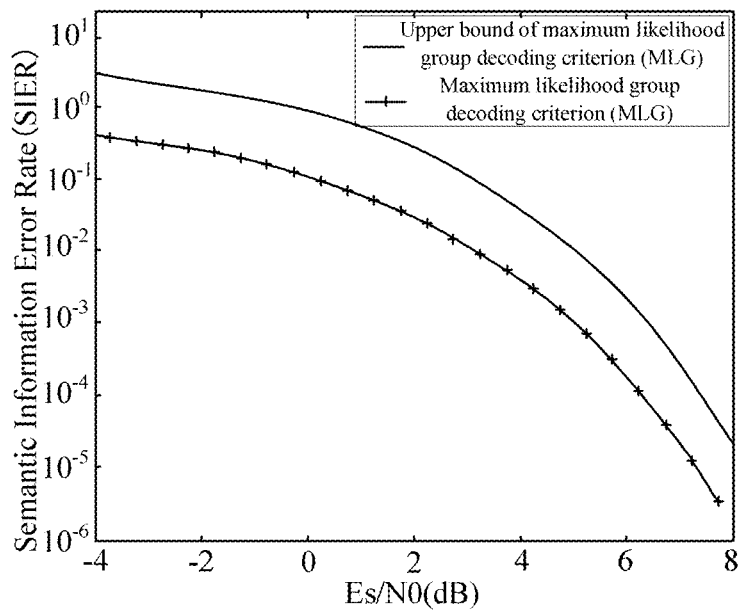
FIG. 14 is a schematic diagram of verification results according to an example of the present disclosure.

FIG. 14 shows the performance and upper bound of the semantic channel encoding scheme adopted in the semantic communication scenario of additive Gaussian white noise channel (AWGN) under the false semantic information rate index. Where, the division of synonymous sets in the semantic channel encoding scheme adopts the maximum Hamming distance criterion between the synonymous sets, and the semantic channel decoder adopts the maximum likelihood group decoding criterion.

It can be seen from the result data shown in FIG. 14 that the encoding and decoding method for semantic channels provided by examples of the present disclosure can recover syntactic information sequences containing semantic information for various signal-to-noise ratios within the test signal-to-noise ratio range under additive Gaussian white noise channel (AWGN) conditions, and can obtain the false semantic information rate of semantic channel encoding. The false semantic information rate decreases exponentially with the increase of signal-to-noise ratio and approaches 0. It should be noted that, due to the conditions of additive Gaussian white noise channel (AWGN) and signal energy normalization, the logarithmic maximum likelihood group decoding criterion, minimum group Euclidean distance decoding criterion, and maximum correlation metric decoding criterion are equivalent to the maximum likelihood group decoding criterion. The performance of this example also represents the performance of these three decoding criteria under same conditions.

It should be noted that the method of the present disclosure can be executed by a single device, such as a computer or a server. The method of present disclosure can also be applied to distributed scenarios, where multiple devices cooperate with each other to complete the task. In the distributed scenario, one device among these multiple devices can only perform one or more steps of the method described in examples of the present disclosure, and these multiple devices will interact with each other to complete the method.

It should be noted that only some examples of the present disclosure have been described above. Other examples are within the scope of the appended claims. In some cases, the actions or steps described in the claims may be performed in a different order than in the examples described above and still achieve the desired results. In addition, the process depicted in the drawings does not necessarily require a specific or continuous order to achieve the desired results. In some implementations, multitasking and parallel processing are also possible or may be advantageous.

Figure 15A:
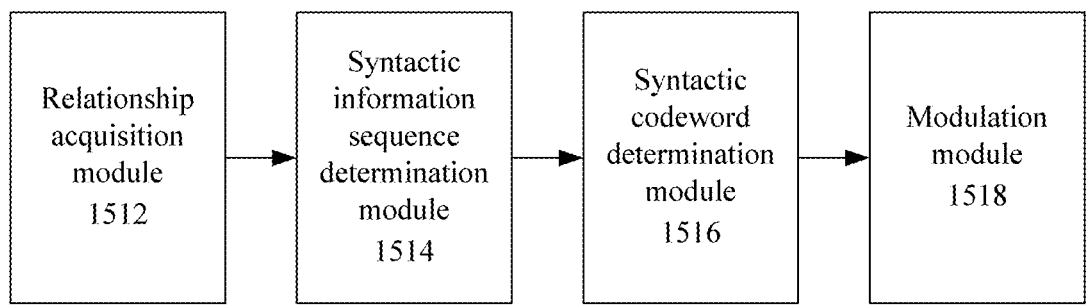
FIG. 15a is a schematic diagram of a structure of an encoding device for semantic channels according to an example of the present disclosure.

Based on a same concept corresponding to any of the above examples, examples of the present disclosure also provide an encoding device for semantic channels. Referring to FIG. 15a, the encoding device for the semantic channels may include: a relationship acquisition module 1512, a syntactic information sequence determination module 1514, a syntactic codeword determination module 1516, and a modulation module 1518.

The relationship acquisition module 1512 is used to obtain a semantic codebook and synonymous mapping relationships pre-constructed.

The syntactic information sequence determination module 1514 is used to determine the syntactic information sequence to be transmitted.

The syntactic codeword determination module 1516 is used to determine a syntactic codeword in the semantic codebook corresponding to the syntactic information sequence based on the synonymous mapping relationships.

The modulation module 1518 is used to modulate the syntactic codeword to obtain a signal vector.

Figure 15B:
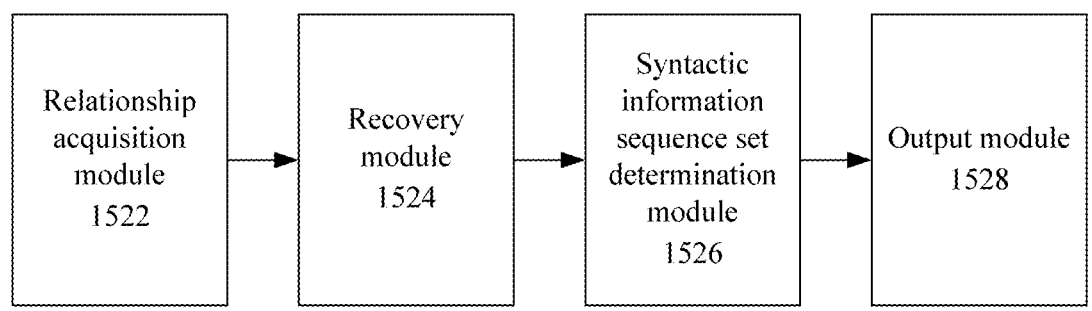
FIG. 15b is a schematic diagram of a structure of a decoding device for semantic channels according to an example of the present disclosure.

Based on a same concept corresponding to any of the above examples, examples of the present disclosure also provide a decoding device for semantic channels. Referring to FIG. 15b, the decoding device for semantic channels include: a relationship acquisition module 1522, a recovery module 1524, a syntactic information sequence set determination module 1526, and an output module 1528.

The relationship acquisition module 1522 is used to obtain a semantic codebook and synonymous mapping relationships pre-constructed.

The recovery module 1524 is used to perform a signal recovery process on a signal vector based on the semantic codebook and a preset decoding criterion to obtain a sequence index of a target synonymous set.

The syntactic information sequence set determination module 1526 is used to determine a target syntactic information sequence set corresponding to the sequence index of the target synonymous set based on the synonymous mapping relationships.

The output module 1528 is used to select a syntactic information sequence from the target syntactic information sequence set as an output result.

The devices can be divided into various modules based on their functions. Of course, the functions of each module can be implemented in the same or multiple software and/or hardware when implementing the present application. The device of the above examples may be used to implement the encoding and decoding methods for semantic channels in any of the above examples, and has the beneficial effects of the corresponding method, which will not be repeated here.

Examples of the present disclosure also provides an electronic device, which includes a memory, a processor, and a computer program stored in the memory and executable on the processor, the processor executes the program to implement the encoding and decoding method for semantic channels.

Figure 16:
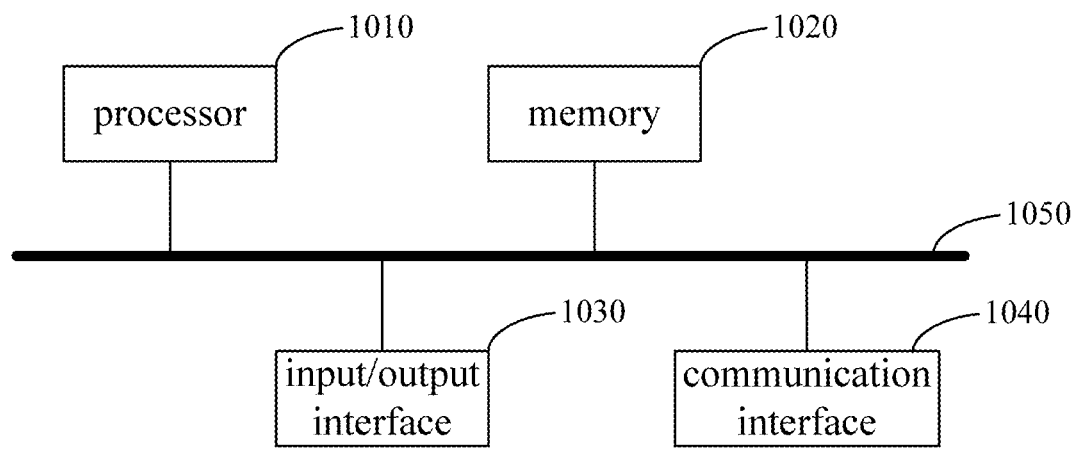
FIG. 16 is a schematic diagram of a structure of an electronic device according to an example of the present disclosure.

FIG. 16 is a schematic diagram illustrating a structure of an electronic device according to some examples of the present disclosure. As shown in FIG. 16, the electronic device may include: a processor 1010, a memory 1020, an input/output interface 1030, a communication interface 1040, and a bus 1050. The processor 1010, the memory 1020, the input/output interface 1030, and the communication interface 1040 may couple to each other via the bus 1050.

The processor 1010 may execute the relevant procedures by virtue of a general central processing unit (CPU), a microprocessor, an application specific integrated circuit (ASIC), or one or more integrated circuits, so as to implement the technical solution provided by the examples of the description.

The memory 1020 may be implemented by a read only memory (ROM), a random-access memory (RAM), a static memory device and a dynamic memory device, etc. The memory 1020 may store an operating system and other application procedures. When the technical solution provided by the example of the description is implemented via the software or the hardware, the related procedure codes are stored in the memory 1020 and revoked by the processor 1010.

The I/O interface 1030 is used for connecting an I/O unit to realize information input and output. The I/O unit may be configured in the device (not in the figure) as a component configuration, and may be externally connected to the device to provide the corresponding functions. The input device may include keyboard, mouse, touch screen, microphone and various sensors. The output device may include display, loudspeaker, vibrator and indicator lamp.

A communication interface 1040 is used for connecting a communication unit (not shown in the figure) to realize communication interaction between the device and other devices. The communication unit may realize communication in a wired manner (for example, USB, wire, etc.) or in a wireless manner (for example, mobile network, WIFI, Bluetooth, etc.).

The bus 1050 includes a passage which transmits information among various components (for example, the processor 1010, the memory 1020, the I/O interface 1030 and the communication interface 1040) on the device.

It should be noted that, although the above-mentioned device merely shows the processor 1010, the memory 1020, the I/O interface 1030, the communication interface 1040 and the bus 1050, the device may further include other components required by the normal operation in the specific implementation process. Besides, those skilled in the art could appreciate that the above-mentioned device may merely include the components required by the solution in the examples of the Description, but not necessarily include all components shown in the figure.

The above-mentioned device of the present disclosure is used to realize the encoding and decoding method for semantic channels in accordance with any of the above examples, and has the beneficial effects of the corresponding method, which will not be repeated here.

Based on a same inventive concept, examples of the present disclosure also provide a non-transitory computer-readable storage medium, which stores a computer instruction. The computer instruction is used to make a computer execute the encoding and decoding method for semantic channels in accordance with any of the above examples.

The computer-readable storage medium in the example includes volatile, non-volatile, movable and non-movable media, which can realize information storage by any method or technology. The information can be computer readable instruction, data structure, program unit or other data. The example of computer storage media includes, but not limited to phase-change memory (PRAM), static random access memory (SRAM), dynamic random access memory (DRAM), other types of random access memory (RAM), read only memory (ROM), electrically erasable programmable read-only memory (EEPROM), flash memory or other memory technologies, compact disk read only memory (CD-ROM), digital versatile disc (DVD) or other optical memories, cassette magnetic tape, tape, disk memory or other magnetic memory device or any other non-transmission media, and available for storing information accessible by the computing devices.

Based on a same inventive concept of the encoding and decoding method for semantic channels described in any of the above examples, the present disclosure also provides a computer program, which includes computer instructions. In some examples, the computer instructions may be executed by one or more processors of a computer to enable the computer and/or processor to execute the encoding and decoding method for semantic channels. Corresponding to the execution subject of each step in examples of the encoding and decoding method for semantic channels, the processor executing the corresponding step can belong to the corresponding execution subject.

The computer program of the above example is used to enable the computer and/or processor to execute an encoding and decoding method for semantic channels as described in any one of the above examples, and has the beneficial effects of corresponding methods, which will not be repeated here.

Those of ordinary skill in the art should appreciate that the discussion on any one of the foregoing examples is merely exemplary, but is not intended to imply that the scope of the present disclosure (including the claims) is limited to these examples. Under the idea of the present disclosure, the technical features of the foregoing examples or different examples may be combined, the steps may be implemented in any order, and there are many other variations in different aspects of the examples of the present disclosure, all of which are not provided in detail for simplicity.

Besides, for the sake of simplifying description and discussion and not making the examples of the present disclosure difficult to understand, the provided drawings may show or not show the public power supply/earthing connection to an integrated circuit (IC) chip and other parts. Besides, the device may be shown in block diagram form to prevent the examples of the present disclosure from being difficult, and moreover, this considers the following facts, that is, the details of the implementations with regard to the devices in these block diagrams highly depend on the platform which will implement the examples of the present disclosure (that is, these details should be completely within the scope understood by those skilled in the art). Where specific details (e.g. circuits) are set forth in order to describe exemplary examples of the present disclosure, it should be apparent to those skilled in the art that the examples of the present disclosure can be practiced without, or with variation of, these specific details. Therefore, these descriptions shall be considered to be illustrative instead of restrictive thereto. Therefore, these descriptions shall be considered to be illustrative instead of restrictive thereto.

While the present disclosure has been described in conjunction with specific examples thereof, many alternatives, modifications and variations of such examples will be apparent to those of ordinary skill in the art in light of the foregoing description. For example, other memory architectures, such as dynamic RAM (DRAM), may use the examples discussed.

The examples of the disclosure are intended to embrace all such alternatives, modifications, and variations as to fall within the broad scope of the appended claims. Therefore, any omission, modification, equivalent replacement and improvement made within the spirits and principles of the examples of the present disclosure shall fall within the protection scope of the present disclosure.

What is claimed is:

1. An encoding method for semantic channels, comprising:
   obtaining a pre-constructed semantic codebook and synonymous mapping relationships;
   determining a syntactic information sequence to be transmitted;

determining a syntactic codeword from the semantic codebook corresponding to the syntactic information sequence based on the synonymous mapping relationships; and modulating the syntactic codeword to obtain a signal vector.

2. The method according to claim 1, further comprising:

determining a syntactic codeword corresponding to each syntactic information sequence in an input syntactic information sequence set; and dividing the syntactic codewords into synonymous sets to obtain the semantic codebook based on a quantity of types of semantic information; wherein, the quantity of the synonymous sets equals to the quantity of types of semantic information; the syntactic codewords in a same synonymous set represent the same semantic information.

3. The method according to claim 2, further comprising:

determining a sequence index of each synonymous set in the semantic codebook;

determining syntactic information sequences corresponding to each synonymous set; wherein, the sequence index of the synonymous set corresponds one-to-one with one type of semantic information; and obtaining mapping relationships between sequence indexes of the synonymous set and syntactic information sequences corresponding to the synonymous set.

4. The method according to claim 1, wherein, determining a syntactic codeword from the semantic codebook corresponding to the syntactic information sequence based on the synonymous mapping relationships comprises:

mapping the syntactic information sequence to be transmitted to a sequence index of a synonymous set which is used to represent the type of the semantic information based on the synonymous mapping relationships;

determining a target synonymous set corresponding to the sequence index of the synonymous set in the semantic codebook; and selecting a codeword from the target synonymous set as the syntactic codeword.

5. An electronic device, comprising a memory, a processor, and a computer program stored in the memory and executable on the processor, wherein the processor executes the computer program to implement the method according to claim 1.

6. A decoding method for semantic channels, comprising:

obtaining a pre-constructed semantic codebook and synonymous mapping relationships;

performing a signal recovery process on a signal vector to obtain a sequence index of a target synonymous set which is used to represent a type of semantic information according to the semantic codebook and a preset decoding criterion;

determining a target syntactic information sequence set corresponding to the sequence index of the target synonymous set based on the synonymous mapping relationships; and selecting a syntactic information sequence from the target syntactic information sequence set as an output result.

7. The method according to claim 6, wherein, the decoding criterion comprises a maximum likelihood group decoding criterion; and the performing a signal recovery process on a signal vector to obtain a sequence index of a target synonymous set which is used to represent a type of semantic information according to the semantic codebook and a preset decoding criterion comprises:

determining group likelihood probabilities between the signal vector and each synonymous set in the semantic codebook;

determining a maximum group likelihood probability in the group likelihood probabilities;

determining a first synonymous set corresponding to the maximum group likelihood probability; and setting a sequence index of the first synonymous set as the sequence index of the target synonymous set.

8. The method according to claim 6, wherein, the decoding criterion comprises a logarithmic maximum likelihood group decoding criterion; and the performing a signal recovery process on a signal vector to obtain a sequence index of a target synonymous set which is used to represent a type of semantic information according to the semantic codebook and a preset decoding criterion comprises:

determining logarithmic group likelihood probabilities between the signal vector and each synonymous set in the semantic codebook;

determining a maximum logarithmic group likelihood probability in the logarithmic group likelihood probabilities;

determining a second synonymous set corresponding to the maximum logarithmic group likelihood probability; and setting a sequence index of the second synonymous set as the sequence index of the target synonymous set.

9. The method according to claim 6, wherein, the decoding criterion comprises a minimum group Euclidean distance decoding criterion; and the performing a signal recovery process on a signal vector to obtain a sequence index of a target synonymous set which is used to represent a type of semantic information according to the semantic codebook and a preset decoding criterion comprises:

determining group Euclidean distances between the signal vector and each synonymous set in the semantic codebook;

determining a minimum group Euclidean distance in the group Euclidean distances;

determining a third synonymous set corresponding to the minimum group Euclidean distance; and setting a sequence index of the third synonymous set as the sequence index of the target synonymous set.

10. The method according to claim 6, wherein, the decoding criterion comprises a maximum group correlation decoding criterion; and the performing a signal recovery process on a signal vector to obtain a sequence index of a target synonymous set which is used to represent a type of semantic information according to the semantic codebook and a preset decoding criterion comprises:

determining group correlations between the signal vector and each synonymous set in the semantic codebook;

determining a maximum group correlation in the group correlations;

determining a fourth synonymous set corresponding to the maximum group correlation; and setting a sequence index of the fourth synonymous set as the sequence index of the target synonymous set.

11. The method according to claim 6, wherein, the decoding criterion comprises a minimum group Hamming distance decoding criterion; and the performing a signal recovery process on a signal vector to obtain a sequence index of a target synonymous set which is used to represent a type of semantic information according to the semantic codebook and a preset decoding criterion comprises:

determining group Hamming distances between the signal vector and each synonymous set in the semantic codebook;

determining a minimum group Hamming distance in the group Hamming distances;

determining a fifth synonymous set corresponding to the minimum group Hamming distance; and setting a sequence index of the fifth synonymous set as the sequence index of the target synonymous set.

12. The method according to claim 6, wherein, determining the target syntactic information sequence set corresponding to the sequence index of the target synonymous set comprises:

determining the target synonymous set according to the sequence index of the target synonymous set;

determining target syntactic information sequences corresponding to syntactic codewords in the target synonymous set based on the synonymous mapping relationships; and integrating the target syntactic information sequences to obtain the target syntactic information sequence set.

13. An electronic device, comprising a memory, a processor, and a computer program stored in the memory and executable on the processor, wherein the processor executes the computer program to implement the method according to claim 6.

* * * * *